United States Patent [19]
Joseph et al.

[11] Patent Number: 5,203,737
[45] Date of Patent: Apr. 20, 1993

[54] MULTIPLE ENTRY AIR PASSAGE

[75] Inventors: Thomas J. Joseph, Milford; Dennis A. Vermette, Westland; Suzanne T. Bertolino, Royal Oak, all of Mich.

[73] Assignee: Ford Motor Company, Dearborn, Mich.

[21] Appl. No.: 870,081

[22] Filed: Apr. 17, 1992

[51] Int. Cl.$^5$ ............................................. B60H 1/26
[52] U.S. Cl. .................................................... 454/139
[58] Field of Search ............... 454/139, 143, 148, 156, 454/159, 161

[56] References Cited

U.S. PATENT DOCUMENTS

| | | | |
|---|---|---|---|
| 4,614,152 | 9/1986 | Fukasaku et al. | 454/139 |
| 4,676,272 | 6/1987 | Jackson | 137/625.41 |
| 4,779,672 | 10/1988 | Seikou et al. | 165/41 |
| 4,802,405 | 2/1989 | Ichitani et al. | 454/139 X |

FOREIGN PATENT DOCUMENTS

| | | | |
|---|---|---|---|
| 3421323 | 12/1985 | Fed. Rep. of Germany . | |
| 2556289 | 6/1985 | France . | |
| 0101813 | 6/1983 | Japan | 165/42 |
| 120513 | 7/1984 | Japan | 454/139 |

*Primary Examiner*—Harold Joyce
*Attorney, Agent, or Firm*—Roger L. May; Peter Abolins

[57] ABSTRACT

A multiple entry air intake passage for a heating and air conditioning system has a first inlet for receiving fresh air and a second inlet for receiving recirculation air, the second inlet having two distinct openings in two walls of the passage housing for increasing the flow of air into the system. An L-shaped damper door has a main portion disposed to seal a main opening of the second inlet, and an auxiliary portion disposed to seal an auxiliary opening of the second inlet. The L-shaped damper door is pivotally mounted onto the housing of the air intake passage to allow pivoting movement between the fresh air and recirculation air positions. The damper door is also slidable along the axis of the pivotal hinge, such that when a bearing surface on the damper door engages a camming ramp at the beginning of pivoting movement away from the fresh air position, the auxiliary portion of the damper door is lifted away from the auxiliary opening, thus reducing wear of the seal disposed upon peripheral portions of the damper door. The passage also includes a hinge lever mounted to the damper door, the hinge lever being suitable for connection to control means which controls movement of the damper door between fresh air and recirculation air positions.

18 Claims, 4 Drawing Sheets

MULTIPLE ENTRY AIR PASSAGE

TECHNICAL FIELD

The present invention is directed to a multiple entry air intake passage for use in an automobile heating and air conditioning system.

BACKGROUND ART

Air intake passages for automobile heating and air conditioning systems have been known since the advent of climate control systems for passenger compartments of automobiles. With the growing popularity of vans and other vehicles with larger-than-standard passenger compartments, there is an increased need to provide climate control systems which will efficiently control the climate in the larger passenger compartment.

While it has been known that a larger air flow through a climate control system will increase the efficiency and rate at which a system can process, and thus control, the volume of air in the passenger compartment, attempts to increase the air flow into climate control systems have had limited success. The application of the principle of achieving a more efficient heat exchange by increasing the air flow to practical use for a motor vehicle passenger climate control system has not been an easy matter. In large part, this is because the spatial constraints of the application do not lend themselves to simply increasing the cross-section of the intake passage.

Other prior art approaches to increasing air flow have included providing additional entries into the intake passage of the vehicle climate control system. For example, Japanese Patent 58-101813 to Yamashita provides a second door 17 to an inlet 18, which door is interlocked to a door 2 of another intake 1. This approach merely provides two doors in the same plane of the housing wall, requiring a larger cross-sectional area to be available in that plane.

In contrast, U.S. Pat. No. 4,802,405 discloses three free-circulated air openings in three different walls of its system casing, but each inlet requires control by a separate damper door. U.S. Pat. No. 4,779,672 similarly discloses a system having two recirculation air inlets, each of which is provided with its own damper door, with corresponding control mechanisms.

French Patent 2,556,289 discloses a mixer box for a vehicle interior heater which provides for selective mix of partial recirculation air which comes entirely from window openings provided in a single wall.

U.S. Pat. No. 4,676,272 generally exemplifies an air flow control passage also not dedicated to the problem of increasing air flow of recirculated air into a vehicle climate control system. Similarly, the system of German Patent 3,421,323 discloses an air distributor which does not address increasing air flow of recirculation air into a system by multiple entries in different walls of the casing.

As will be seen below, the multiple entry air intake passage of the present invention provides a simplified design for increasing air flow while simultaneously eliminating the need for extra doors and door actuating mechanisms, in turn providing savings in cost and size.

SUMMARY OF THE INVENTION

It is an object of the present invention to provide a multiple entry air intake passage of simple design which increases efficiency of heat exchange in a vehicle climate control system by increasing air flow.

An additional object of the present invention is to provide a multiple entry air intake passage having two recirculation air inlets, each in a different wall, both of which are controlled by a single damper door and a single control mechanism.

A further object of the invention to use the same damper door and control mechanism to selectively control intake of air into the system from either the fresh air inlet or the recirculation air inlet.

Yet another object of the present invention is to provide a multiple entry air intake passage of simple design, easy manufacture and low cost.

In a preferred embodiment, the intake passage of the present invention has a first inlet for receiving fresh air, a second inlet for receiving recirculation air from the passenger compartment, and an outlet for conveying air to the heat exchanger of the climate control system. The second inlet for receiving recirculation air from the vehicle occupant compartment comprises a main opening in a first wall of the intake passage housing and an auxiliary opening in a second wall of the housing, the main and auxiliary openings being generally perpendicular to one another. An L-shaped damper door is pivotally mounted on the housing for movement between a fresh air position and a recirculation air position. In the fresh air position, the first inlet, for fresh air, is open and the main opening and auxiliary opening of the second inlet, for recirculation air, are sealed by respective main and auxiliary portions of the L-shaped damper door. In the recirculation air position, the L-shaped damper door seals the first, fresh air inlet while simultaneously opening both the main and auxiliary openings of the second, recirculation air inlet. Movement of the L-shaped damper door is controlled by means, such as a vacuum source, having an actuator arm connected to a hinge lever, which is affixed to the extending bottom pintle end of a hinge pintle by which the L-shaped damper door is pivotally mounted upon the housing.

The present invention may also provide sealing means to seal the portions of the L-shaped damper door to respective portions of the inlets. The sealing means may be provided with a protective skin to extend wear. Further, the present invention may also provide an L-shaped damper door which is slidable along the axis of the hinge pintle, while also providing camming means by which the L-shaped damper door may be cammed in the axis of the hinge pintle while it is in an intermediate, pivoting movement between the fresh air and recirculation air positions. The present invention further provides biasing means for biasing the auxiliary portion of the L-shaped damper door against the floor of the housing in the fresh air position and against the auxiliary opening of the second, recirculation air inlet in the recirculation air position.

The invention, together with additional features, objects and advantages thereof, is best understood by reference to the following description, when taken in connection with the accompanying illustrative drawings.

BEST MODE FOR CARRYING OUT THE INVENTION

Figure 1:
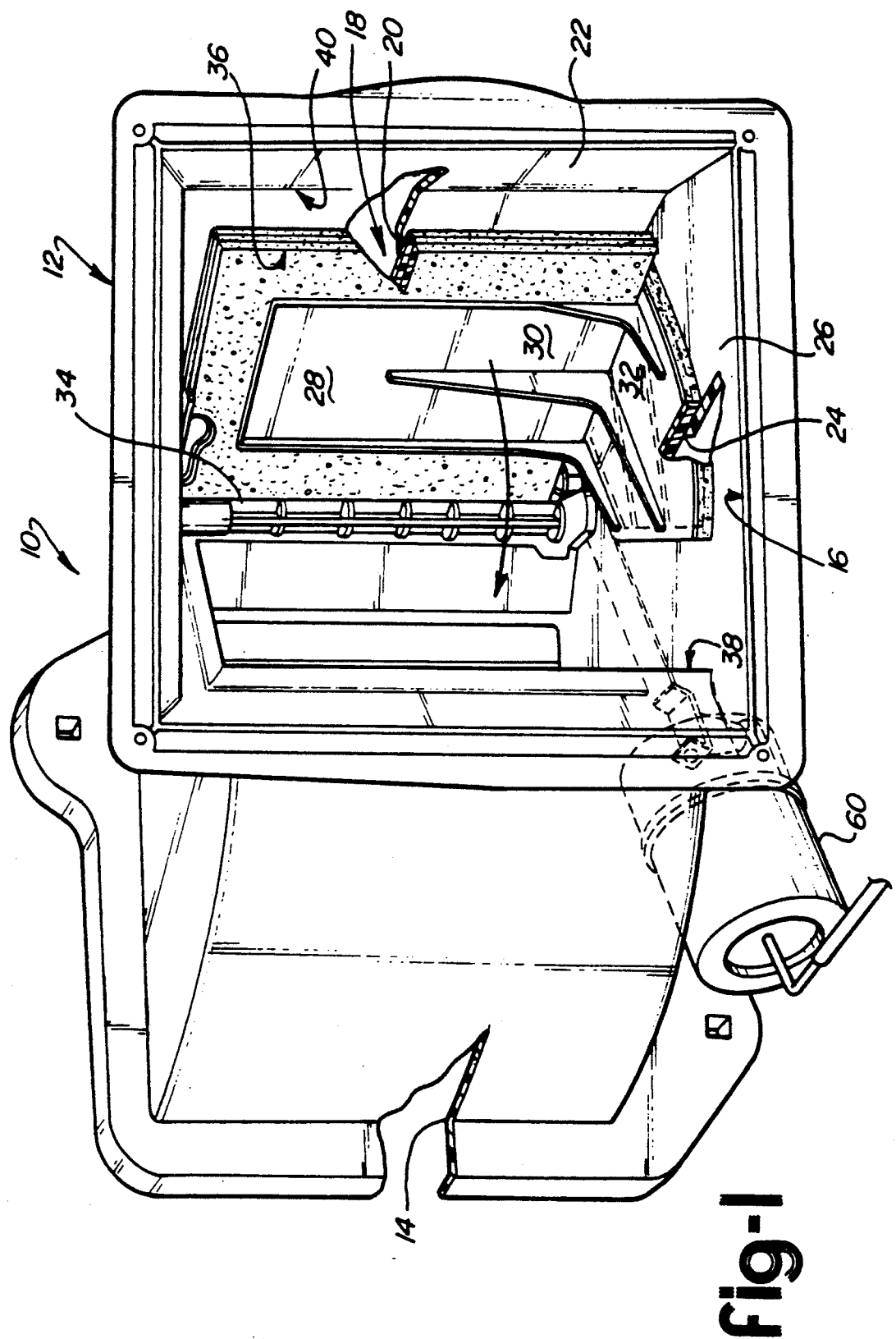
FIG. 1 is an elevational, perspective view of a multiple entry air passage intake passage, with various cutaway sections, made in accordance with the present invention.

FIG. 1 shows a preferred embodiment of a multiple entry air intake passage made in accordance with the present invention. An air intake passage 10 comprises a housing 12, which in a preferred embodiment may be formed of polycarbonite-ABS blend plastic, although those skilled in the art will appreciate that other materials may also be used for the housing 12.

Figure 2:
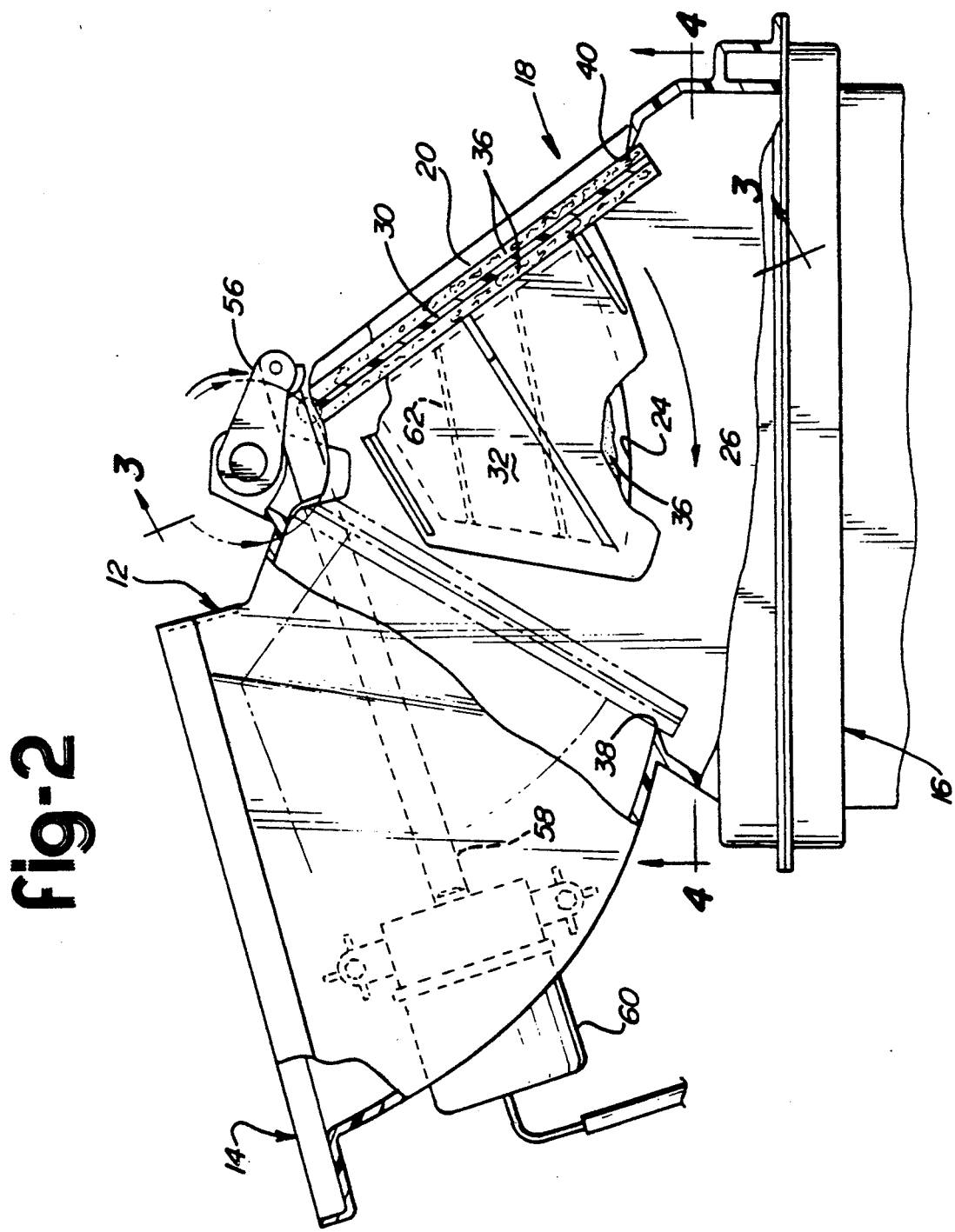
FIG. 2 is a top view, shown partly in cut-away illustrating an L-shaped damper door in a first, fresh air position and, in phantom lines, in a second, recirculation air position.

As best seen in FIG. 2, housing 12 includes a first inlet 14 for fresh air and an outlet 16 which discharges the air to the heat exchanger of the heating and air conditioning unit of the climate control system.

FIGS. 1 and 2 also illustrate second inlet 18 for recirculation air which includes a main opening 20 located in a first wall 22 of housing 12, and an auxiliary opening 24 located in a second wall 26 of housing 12. As seen in FIG. 1, first wall 22, in which lies main opening 20, and second wall 26, in which lies auxiliary opening 24, are generally perpendicular to one another, so that main opening 20 and auxiliary opening 24 are also generally perpendicular to each other.

Air intake passage 10 also includes a damper door 28 which is generally L-shaped and has a main portion 30 and an auxiliary portion 32. As seen in FIG. 1, main portion 30 of damper door 28 is disposed to engage main opening 20 in first wall 22 of second inlet 18. Auxiliary portion 32 of damper door 28 is located to engage the auxiliary opening 24, disposed in second wall 26, of second inlet 18.

Air intake passage 10 is also provided with means 34 for pivotally mounting L-shaped damper door 28 to housing 12. As shown in FIG. 1, in a preferred embodiment, such pivotal mounting means 34 may be a hinge which is formed integrally and contiguously with, or affixed to, the main portion 30 of damper door 28. As shown in phantom lines in FIG. 2, the pivotal mounting of damper door 28 allows damper door 28 to pivot into a recirculation air position in which main portion 30 and auxiliary portion 32 close off fresh air from first inlet 14, allowing the intake of air through main opening 20 and auxiliary opening 24 of second inlet 18, the recirculation air inlet.

Figure 4:
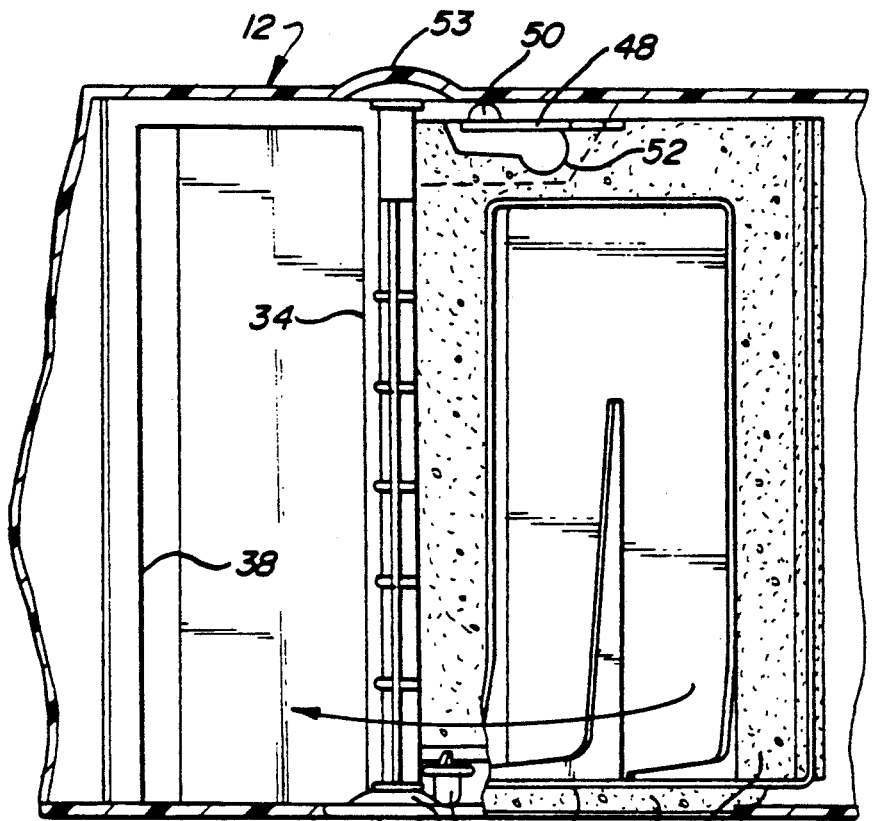
FIG. 4 is a cut-away side view of the damper door in the fresh air position, taken along plane 4—4 of FIG. 2, showing details of the pivotal mounting of the damper door to the housing, with an arrow showing the direction of pivotal movement of the damper door toward the recirculation air position.

The peripheral areas of both sides of main portion 30 of damper door 28, as well as of the exterior surface of auxiliary portion 32 of damper door 28 are provided with sealing means 36 to seal main portion 30 and auxiliary portion 32 of damper door 28 against the respective openings of second inlet 18. Similarly, sealing means 36 disposed on the peripheral area of the internal side of main portion 30 seals damper door 28 against an internal sealing surface interior of first inlet 14, when damper door 28 is in a recirculation air position. Preferably, internal knife-edge sealing surfaces 38 and 40 are provided interior to first inlet 14 and to main opening 20, respectively, to provide a better seal when sealing means 36 engages those respective sealing surfaces. The top edge of knife-edge sealing surface 40 is configured so that a portion contacts main portion 30 of damper door 28 just central to the biasing means described below, as seen in FIG. 4, in order to minimize leakage through that area of main portion 30. No knife-edge sealing surface is provided around auxiliary opening 24 to reduce friction on sealing means 36 during pivotal movement of damper door 28. Alternatively, sealing means 36 may be disposed upon portions of the interior surfaces of main opening 20 and auxiliary opening 24 of second inlet 18 and of first inlet 14 which contact the peripheral areas of main portion 30 and auxiliary portion 32.

In a preferred embodiment, sealing means 36 may be a foam pad, and further may be provided with a protective skin such as Mylar to increase the wear of sealing means 36 which encounters friction during pivoting between the fresh air position and recirculation air position of damper door 28.

Figure 3:
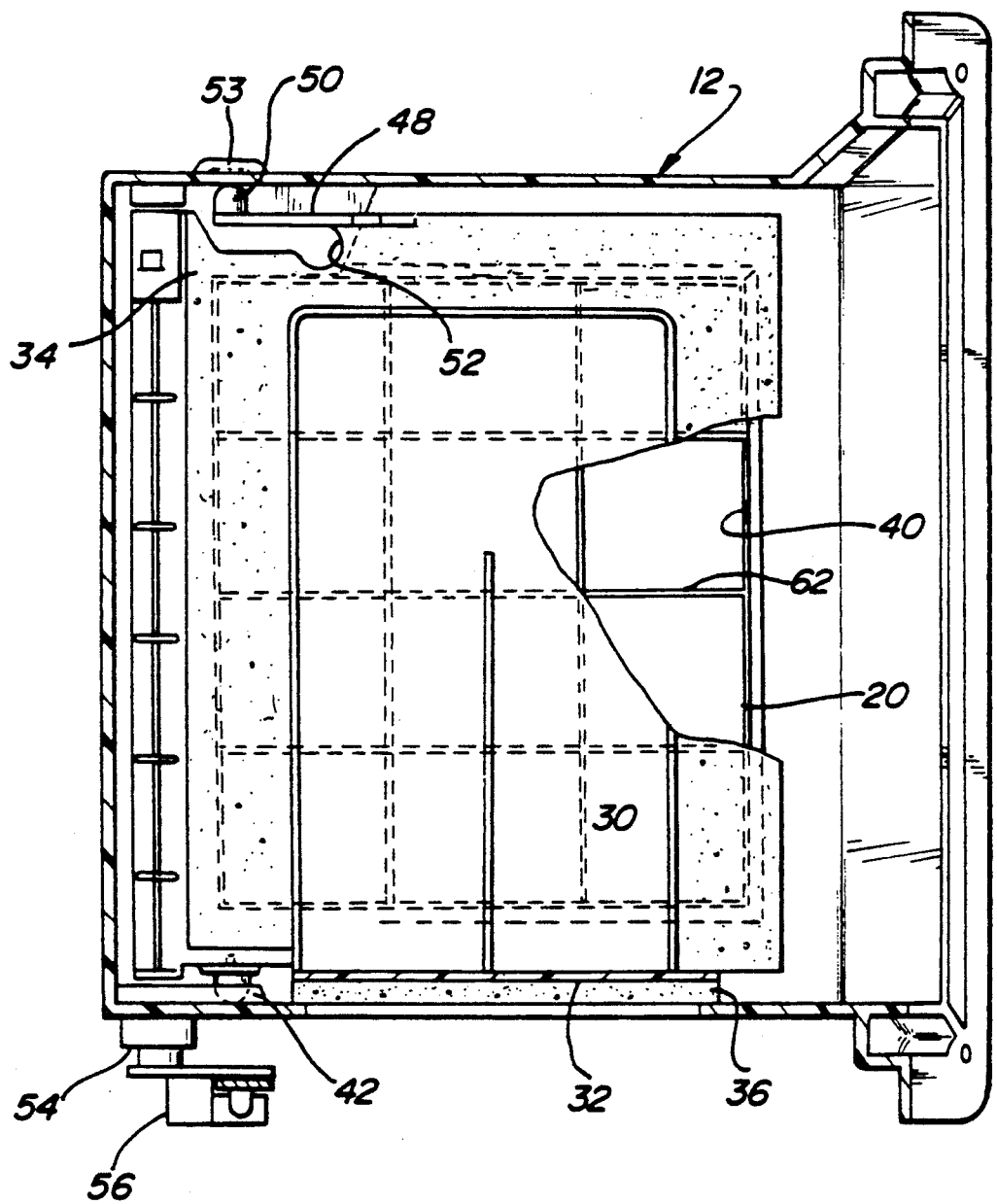
FIG. 3 is a cut-away side view of the L-shaped damper door, taken along plane 3—3 in FIG. 2.
Figure 5:
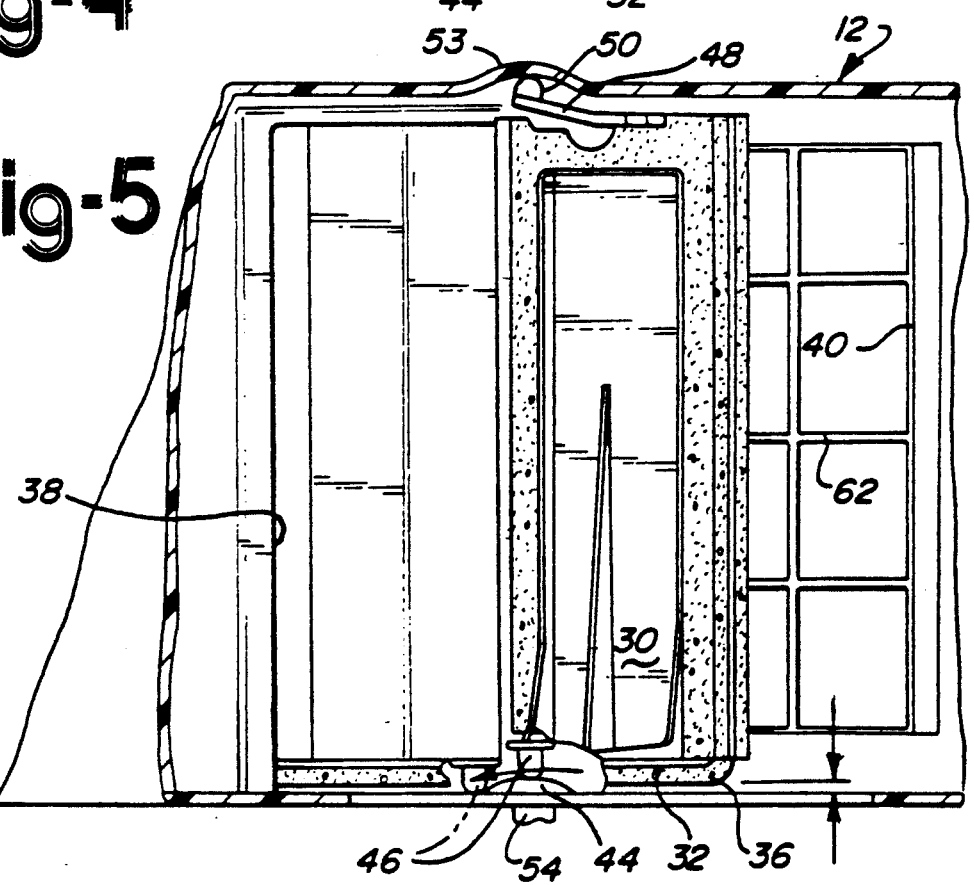
FIG. 5 is a cut-away side view of the damper door during its pivoting movement from the fresh air position to the recirculation air position, showing detail of the camming means.

As seen in FIGS. 3, 4 and 5, housing 12 is preferably provided with camming means 42 for camming damper door 28. In a preferred embodiment, camming means 42 may comprise a camming ramp 44 disposed adjacent said pivotal mounting means 34 on an interior bottom surface of housing 12 and a bearing element 46 disposed upon the lower edge of main portion 30 of the damper door 28. Camming ramp 44 preferably has a smooth, generally elliptical contour to promote smooth action of the damper door 28 during movement between the fresh air and recirculation air positions. In this preferred embodiment, pivotal mounting means 34 includes a hinge pintle which is mounted upon housing 12 in a manner which allows the hinge pintle, and the contiguous damper door 28, to slide along the axis of the pintle relative to the housing. Since bearing element 46 is rigidly mounted upon main portion 30 of damper door 28, pivotal movement of damper door 28 causes bearing element 46 to engage camming ramp 44. This, in turn, forces damper door 28 to slide along the hinge pintle axis, thus camming auxiliary portion 32 away from auxiliary opening 24. This camming of auxiliary portion 32 at the beginning of the pivoting movement of damper door 28 reduces the wear of sealing means 36 located upon auxiliary portion 32.

As seen in FIG. 3, the upper edge of main portion 30 of damper door 28 is provided with biasing means 48 to bias the damper door 28 against auxiliary opening 24, increasing the compression of the seal of sealing means 36 disposed upon auxiliary portion 32 as it seats against auxiliary opening 24 of second inlet 18. In a preferred embodiment, biasing means 48 is a projecting arm extending out of the edge of main portion 30 and having a bearing element 50. The projecting arm of biasing means 48 functions as a spring clip exerting force against an inner portion of housing 12. It has been found that the rounded cutaway portion 52 proximal to the projecting arm, as shown in FIG. 3, provides more even distribution of stress forces during pivoting movement of damper door 28.

FIG. 4 shows that in the fresh air position, main portion 30 and auxiliary portion 32 of damper door 28 are respectively seated against main opening 20 and auxiliary opening 24 of second inlet 18, thus sealing off recirculation air from intake by the air intake passage 10. Biasing means 48 exerts force against an inner portion of housing 12 to urge auxiliary portion 32 of damper door 28 against auxiliary opening 24, thus increasing the compression of sealing means 36 disposed upon auxiliary portion 32 as it seats against auxiliary opening 24. In such a position, bearing element 46 of damper door 28 is not yet engaging camming ramp 44.

FIG. 5 illustrates the operation of damper door 28 during pivoting movement between the fresh air position and the recirculation air position. Early in such pivoting movement, bearing element 46 of damper door 28 engages camming ramp 44, causing pivotal mounting means 34 to slide along the axis of the hinge pintle, simultaneously camming damper door 28 against the bias of biasing means 48. As also shown in FIG. 5, camming ramp 44 has a relatively small height, designated by the letter A. Height A is just sufficient to clear auxiliary portion 32 away from auxiliary opening 24 to reduce the wear of sealing means 36. Camming ramp 44 is configured and located to begin camming auxiliary portion 32 away from auxiliary opening 24 when damper door 28 begins its pivoting movement away from the fresh air position, in which sealing means 26 disposed on auxiliary portion 32 is seated against auxiliary opening 24.

As also seen in FIG. 5, camming ramp 44 is configured to allow damper door 28 to slide back along the axis of pivotal mounting means 34 under the force of biasing means 48 as damper door 28 pivots into the recirculation air position, in which main portion 30, and its related sealing means 36, seat against the sealing surface 38 of first inlet 14. Additionally, the top surface of housing 12 is provided with concave housing portion 53, located above and in direct alignment with camming ramp 44, and which generally parallels the contour of camming ramp 44. During pivoting movement of damper door 28 across camming ramp 44, biasing means 48 thus maintains a generally constant amount of biasing force on damper door 28, since the distance between bearing element 46 and bearing element 50 is relatively constant in all positions of damper door 28.

Pivotal mounting means 34 has a bottom pintle end 54 which extends through the bottom of housing 12 and ends in a hinge lever 56, as seen in FIG. 3. As will be appreciated by those skilled in the art, it is merely a design choice whether hinge lever 56, bottom pintle end 54 and pivotal mounting means 34 are unitary or are formed separately and are permanently affixed to each other during manufacture. For ease of manufacture, in a preferred embodiment, bottom pintle end 54 extends through the housing and hinge lever 56 is unitary therewith. Further, bottom pintle end 54 is rigidly affixed to pivotal mounting means 34. It is thus seen that damper door 28, pivotal mounting means 34, botto mpintle end 54 and hinge lever 56 are all fixed relative to each other.

Hinge lever 56 connects to an actuator arm 58 of a vacuum source 60, as shown in FIG. 2. Thus, in operation, a vehicle occupant uses control means to control the operation of the vacuum source 60 to move actuator arm 58, which in turn, moves the hinge lever 56. Movement of hinge lever 56, linked through bottom pintle end 54 to pivotal mounting means 34, controls movement of damper door 28 between the fresh air position and the recirculation air position. Those skilled in the art will appreciate that various other means for controlling the movement of hinge lever 56, including for example, direct manual linkage to a control lever operated by the vehicle occupant, also fall within the scope of this invention.

As may be noted in FIGS. 3 and 5, openings such as auxiliary opening 24 and main opening 20 of second inlet 18 may be provided with a protective grid 62 work which is unitary with housing 12 of intake passage 10. If such grid work is provided, the grid work associated with auxiliary opening 24 is preferably oriented to be generally parallel to the direction of pivoting movement of damper door 28 to reduce friction between grid work 62 and sealing means 36 disposed on auxiliary portion 32. Additionally, as seen in FIG. 1, suitable connections means such as screw holes and mounting pins, may be provided in housing 12 to suitably mount air intake passage 10 to the remainder of the climate control system of the vehicle.

While the best mode for carrying out the invention has been described in detail, those familiar with the art to which this invention relates will recognize various alternative designs and embodiments for practicing the invention as defined by the following claims.

I claim:

1. An air intake passage for a heating and air conditioning system comprising:

a housing having a first inlet for receiving fresh air, and an outlet for conveying air to a heating and air conditioning unit, said housing also having second inlets for receiving recirculation air from a vehicle occupant compartment, said second inlets having a main opening and an auxiliary opening extending generally perpendicularly to each other;

an L-shaped damper door pivotally mounted on said housing for movement between fresh air and recirculation air positions, said damper door having a main portion for opening said first inlet and closing said main opening when said damper door is in said fresh air position and for closing said first inlet and opening said second inlet when said damper door is in said recirculation air position, said damper door also having an auxiliary portion for opening said auxiliary opening when said damper door is in said recirculation air position and for closing said auxiliary opening when said damper door is in said fresh air position, said auxiliary damper door element contiguous to, and generally perpendicular to said main damper door element;

said housing also having camming means for camming said L-shaped damper door away from said auxiliary opening while said damper door is in intermediate, pivoting movement between said fresh air position and said recirculation air position.

2. The air intake passage of claim 1 wherein said camming means comprises at least one camming ramp disposed upon said housing adjacent the pivotal mounting of said damper door upon said housing.

3. The air intake passage of claim 1 further comprising sealing means for sealing said main and auxiliary portions against respective openings of said second inlets in said fresh air position and for sealing said main portion against said first inlet in said recirculation air position.

4. The air intake passage of claim 3 wherein said sealing means is disposed upon said main and auxiliary portions.

5. The air intake passage of claim 4 wherein said sealing means is provided with a protective skin.

6. The air intake passage of claim 5 wherein said protective skin is mylar.

7. The air intake passage of claim 1 wherein said damper door has a hinge pintle for pivotal mounting of said damper door upon said housing, said hinge pintle and damper door being slidable along the axis of said hinge pintle relative to said housing, said hinge pintle further having a bottom pintle end extending through and beyond said housing.

8. The air intake passage of claim 7 further comprising control means for controlling movement of said damper door between said fresh air and recirculation air positions.

9. The air intake passage of claim 8 wherein said control means includes an actuator having an elongate actuator arm, said actuator arm being connected to a hinge lever mounted upon said bottom pintle end whereby movement of said actuator arm pivots said hinge lever, in turn pivoting said hinge pintle and said damper door between said fresh air and recirculation air positions.

10. The air intake passage of claim 9 wherein said control means is a vacuum source.

11. The air intake passage of claim 1 further comprising biasing means for biasing said auxiliary portion of said damper door against said auxiliary opening when said damper door is in said fresh air position.

12. The air intake passage of claim 11 wherein said biasing means is disposed upon said main portion and biases said damper door against said auxiliary opening.

13. The air intake passage of claim 1 wherein said housing and said damper door are plastic.

14. The air intake passage of claim 13 wherein said plastic is carbonite-ABS blend plastic.

15. An air intake passage for a heating and air conditioning system comprising:
- a housing having a first inlet for receiving fresh air and an outlet for conveying air to a heating and air conditioning unit, said housing also having second inlets for receiving recirculation air from a vehicle occupant compartment, said second inlets having a main opening and an auxiliary opening extending generally perpendicularly to each other;
- an L-shaped damper door pivotally mounted on said housing for movement between fresh air and recirculation air positions, said damper door having a main portion for opening said first inlet and closing said main opening when said damper door is in said fresh air position and for closing said first inlet and opening said main opening when said damper door is in said recirculation air position, said damper door also having an auxiliary portion for opening said auxiliary opening when said damper door is in said recirculation air position and for closing said auxiliary opening when said damper door is in said fresh air position, said auxiliary damper door element contiguous with, and generally perpendicular to said main damper door element;
- camming means for camming said L-shaped damper door away from said auxiliary opening while said damper door is in intermediate, pivoting movement between said fresh air position and said recirculation air position; and
- control means for controlling movement of said damper door between said fresh air and recirculation air positions.

16. The air intake passage of claim 15 further comprising sealing means for sealing said main and auxiliary portions against respective openings of said second inlet in said fresh air position and for sealing said main portion against said first inlet in said recirculation air position.

17. The air intake passage of claim 15 further comprising biasing means for biasing said auxiliary portion of said damper door against said auxiliary opening when said damper door is in said fresh air position.

18. The air intake passage of claim 17 wherein said housing comprises a concave housing portion located in direct alignment with said camming means whereby said biasing means maintains a generally constant biasing force in all positions of said damper door.

* * * * *

UNITED STATES PATENT AND TRADEMARK OFFICE
CERTIFICATE OF CORRECTION

PATENT NO. : 5,203,737

DATED : April 20, 1993

INVENTOR(S) : Thomas J. Joseph et al

It is certified that error appears in the above-identified patent and that said Letters Patent is hereby corrected as shown below:

Title page, No. 75, insert --Gary L. Parmenter, Ypsilanti-- at the end of the listing of the inventors.

Column 5, line 56, "botto mpintle" should be --bottom pintle--.

Signed and Sealed this

Twenty-first Day of December, 1993

*Attest:*

BRUCE LEHMAN

*Attesting Officer*     *Commissioner of Patents and Trademarks*